US010623178B2

(12) United States Patent
Savage et al.

(10) Patent No.: US 10,623,178 B2
(45) Date of Patent: Apr. 14, 2020

(54) SYSTEM AND METHOD FOR SECURE MESSAGING BETWEEN DISTRIBUTED COMPUTING NODES

(71) Applicant: Dell Products L.P., Round Rock, TX (US)

(72) Inventors: Marshal F. Savage, Austin, TX (US); Cyril Jose, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 15/211,205

(22) Filed: Jul. 15, 2016

(65) Prior Publication Data
US 2018/0019869 A1 Jan. 18, 2018

(51) Int. Cl.
*H04L 9/08* (2006.01)
*H04L 29/06* (2006.01)
*H04L 9/16* (2006.01)
*G06F 21/60* (2013.01)

(52) U.S. Cl.
CPC .......... *H04L 9/0822* (2013.01); *G06F 21/606* (2013.01); *H04L 9/0833* (2013.01); *H04L 9/0891* (2013.01); *H04L 9/16* (2013.01); *H04L 63/0435* (2013.01); *H04L 63/065* (2013.01)

(58) Field of Classification Search
CPC . H04L 63/04; H04L 63/0428; H04L 63/0435; H04L 63/06; H04L 63/062; H04L 63/065; H04L 63/068; H04L 9/08; H04L 9/0805; H04L 9/0816; H04L 9/0819; H04L 9/0822; H04L 9/0833; H04L 9/0838; H04L 9/16; H04L 9/0891; G06F 21/606
See application file for complete search history.

(56) References Cited

U.S. PATENT DOCUMENTS

| | | | |
|---|---|---|---|
| 6,295,361 B1* | 9/2001 | Kadansky | H04L 29/06 380/273 |
| 9,887,836 B1* | 2/2018 | Roth | H04L 9/0822 |
| 2016/0218866 A1* | 7/2016 | Patil | H04L 9/0833 |
| 2016/0344582 A1* | 11/2016 | Shivanna | H04L 41/04 |
| 2016/0365975 A1* | 12/2016 | Smith | H04L 9/0822 |
| 2017/0126404 A1* | 5/2017 | Unagami | H04L 9/0833 |
| 2017/0265018 A1* | 9/2017 | Mok | H04W 4/70 |
| 2018/0262499 A1* | 9/2018 | Tang | H04L 67/125 |

\* cited by examiner

*Primary Examiner* — Kambiz Zand
*Assistant Examiner* — Alexander R Lapian
(74) *Attorney, Agent, or Firm* — Baker Botts L.L.P.

(57) ABSTRACT

Methods and systems for secure messaging may involve receiving an encrypted message from a node, decrypting the message using a default key, sending a message, rotating a group key, and distributing a key rotation message. The message received may be to discover a master of a group. The message sent may welcome the node into the group as a member. The welcome message may be encrypted with the default key and may include information to determine the group key. The group key may be rotated based on an expiration of a group key rotation window. The group key may become a prior group key and the rotated group key may be a current group key. The key rotation message may be encrypted with one of the default key or the prior group key and may include information to determine the current group key.

20 Claims, 4 Drawing Sheets

SYSTEM AND METHOD FOR SECURE MESSAGING BETWEEN DISTRIBUTED COMPUTING NODES

BACKGROUND

Field of the Disclosure

This disclosure relates generally to information handling systems and more particularly to systems and methods for secure messaging between distributed computing nodes.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of management controllers in information handling systems has increased in recent years. Broadly speaking, a management controller may be a device, system, or apparatus for remote monitoring or management of an information handling system. A management controller may be enabled to use a so-called 'out-of-band' network interface that is physically isolated from an 'in-band' network interface used generally for non-management communications. The management controller may include, or be an integral part of, a baseboard management controller (BMC), a Dell Remote Access Controller (DRAC), or an Integrated Dell Remote Access Controller (iDRAC). The management controller may be a secondary information handling system embedded in the information handling system.

SUMMARY

A secondary information handling system, which may be in the form of a management controller may communicate with other management controllers to form a distributed computing node group. The members or nodes in the group may message each other. However, malicious attacks may attempt to intercept or otherwise alter the messaging between the members or nodes. Thus, it may be desirable to support secure messaging between distributed computing nodes in a group.

Secure messaging using shared symmetric keys may be limited in application due to the ability for malicious attackers to gain access to the keys when shared. Moreover, secure messaging using asymmetric keys may be limited in application due to the processing requirements and complexities of managing the key pairs. Thus, it may be desirable to support secure messaging without sharing keys or managing key pairs. A distributed computing node group may support secure messaging by sharing an index or value into a hashmap or table, which may be used to generate a key. The index or value may be rotated randomly on a periodic basis. Moreover, secure messages in a noisy and/or congested environment may be susceptible to data loss. Thus, it may be desirable to detect data loss of secure messages and to support secure messaging resynchronization and/or re-transmission.

In one aspect, a disclosed method for secure messaging between distributing computing nodes includes receiving an encrypted message from a node, decrypting the message using a default key, sending a message, rotating a group key, and distributing a key rotation message. The message received may be to discover a master of a group. The message sent may welcome the node into the group as a member. The welcome message may be encrypted with the default key and may include information to determine the group key. The group key may be rotated based on expiration of a group key rotation window. The group key may become a prior group key and the rotated group key may be a current group key. The key rotation message may be encrypted with one of the default key or the prior group key, and may include information to determine the current group key.

In certain embodiments, the method may include receiving another encrypted message from a member of the group and decrypting the message using a prior group key based on a determination that the decryption of the message using the current group key is not valid. The method may include receiving a request to redistribute the current group key. The request may be encrypted with one of the default key or the prior group key. The method may include resending, in response to the request, a message. The message may be encrypted with the default key and may include information to determine the current group key.

Another disclosed aspect includes an information handling system, comprising a processor subsystem having access to a first memory, and a management controller comprising a secondary processor having access to a second memory, the second memory including an embedded storage partition and the second memory storing instructions executable by the secondary processor.

A further disclosed aspect includes a management controller for an information handling system having a primary processor and a primary memory, the management controller comprising a secondary processor having access to a second memory, the second memory including an embedded storage partition and the second memory storing instructions executable by the secondary processor.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
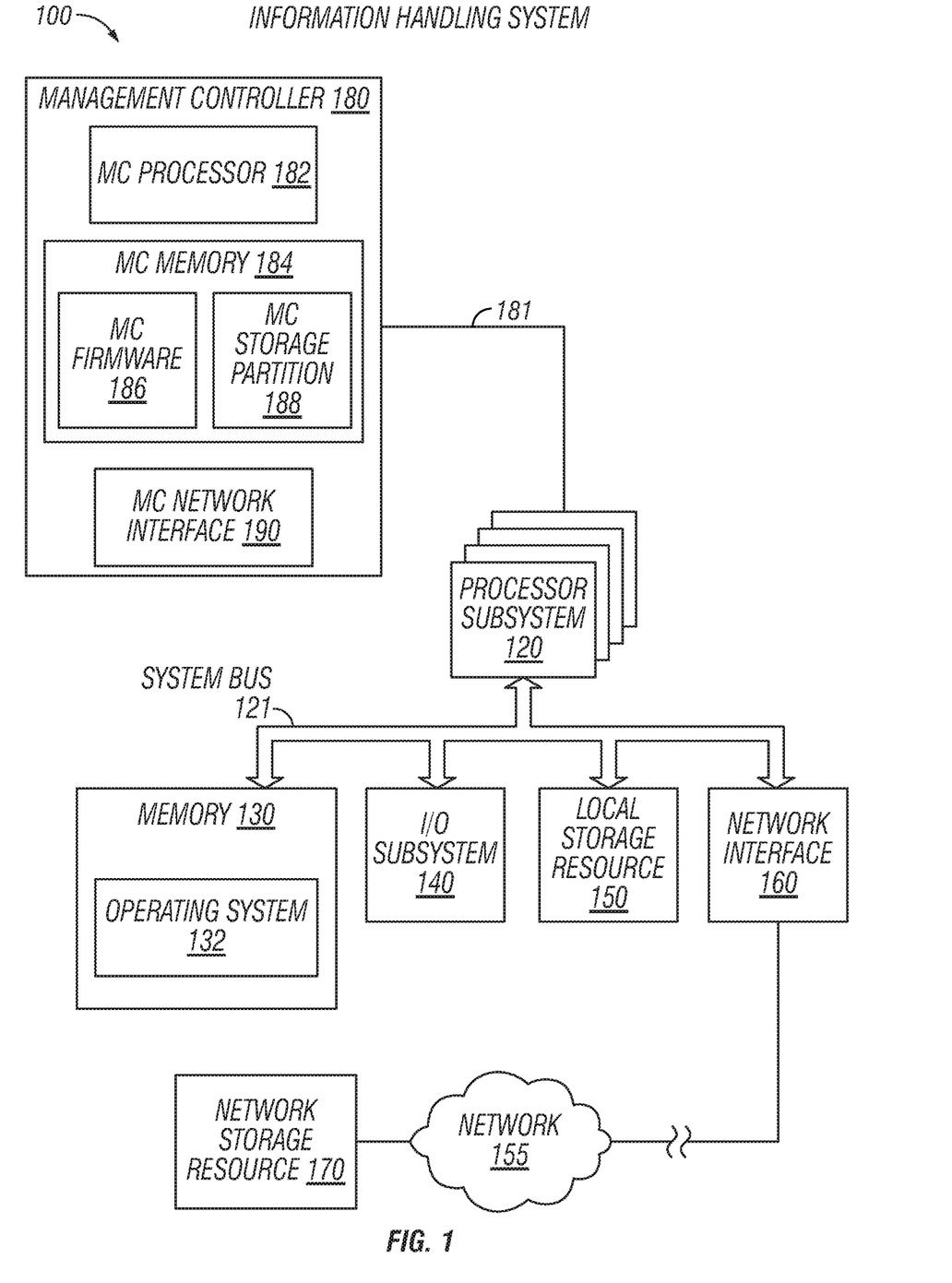
FIG. 1 is a block diagram of selected elements of an information handling system for secure messaging, in accordance with some embodiments of the present disclosure.
Figure 2:
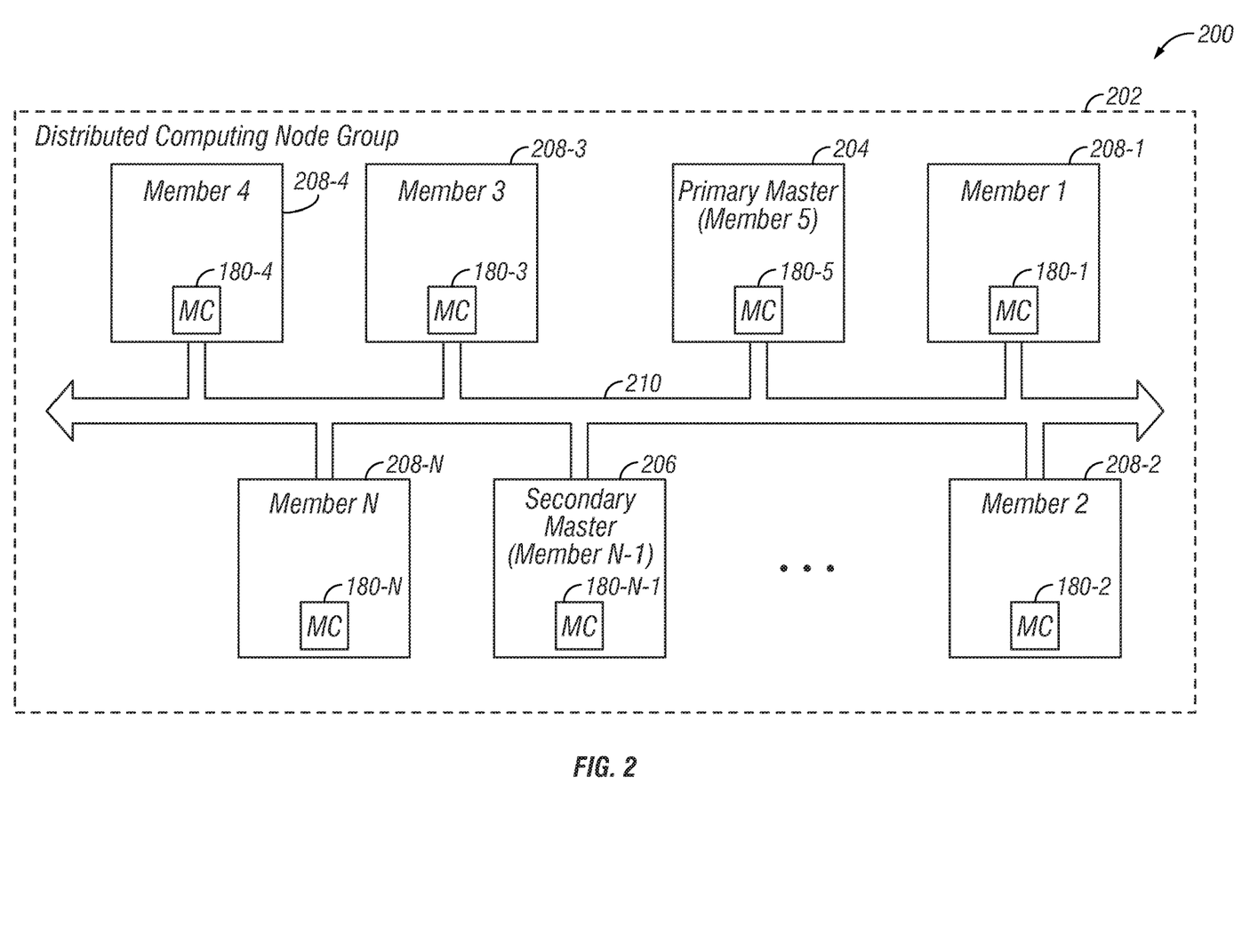
FIG. 2 is a block diagram of selected elements of a distributed computing node group for secure messaging, in accordance with some embodiments the present disclosure.
Figure 3:
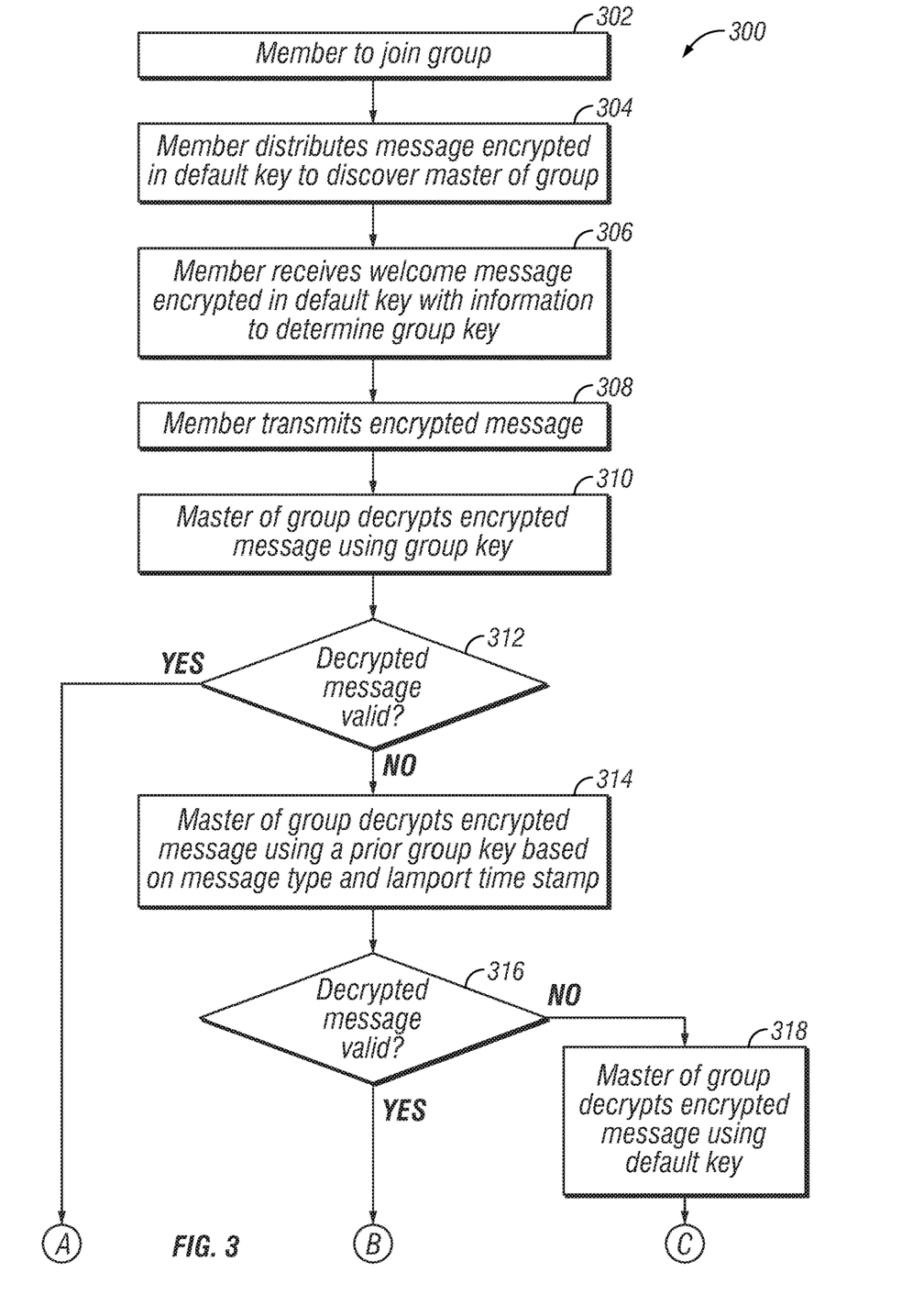
FIG. 3 is a flow chart depicting selected elements of a method for secure messaging, in accordance with some embodiments the present disclosure.

Particular embodiments are best understood by reference to FIGS. 1-3 wherein like numbers are used to indicate like and corresponding parts.

Turning now to the drawings, FIG. 1 illustrates a block diagram depicting selected elements of an embodiment of information handling system 100 for secure messaging. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, information handling system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC 180 may interface with processor subsystem 120 using any suitable communication link 181 including, but not limited to, a direct interface with a platform controller hub, a system bus, and a network interface. The system bus may be system bus 121, which may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. The network interface may be network interface 160 and/or network interface 190.

The platform controller hub may provide additional functionality for the processor subsystem 120. The platform controller hub may be internal or external to a processor in processor subsystem 120. The direct interface may be any suitable interface to enable communications, including but not limited to Direct Media Interface (DMI) or PCI-Express.

MC processor 182 may have access to MC memory 184, which may store MC firmware 186, representing instructions executable by MC processor 182. Also shown stored in MC memory 184 is MC storage partition 188, which may represent an embedded storage partition for management controller 180. MC firmware 186 may represent pre-boot instructions executable by MC processor 182, for example, for preparing information handling system 100 to boot by activating various hardware components in preparation of launching operating system 132 for execution (also referred to as a basic input/output system (BIOS)). In certain embodiments, MC firmware 186 includes a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide "out-of-band" network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of iDRAC while MC firmware 186 may include a lifecycle controller, which may assist in a variety of functions including, but not limited to, monitoring, updating, maintaining, testing, and deploying one or more components for an information handling system.

Management controller 180 may communicate with other management controllers using MC network interface 190. A set of management controllers in communication may form a group, in which each management controller may be a node. One of the management controllers in the group may operate as a group manager or a master. The master may facilitate and manage secure communication between the management controllers in the group.

A distributed computing node group supporting secure messaging may use a hashmap or table stored in a management controller to generate symmetric keys. The hashmap or table may be identical on each member or node in a distributed computing node group. The use of a hashmap or table may enable secure messaging by sharing an index or value in the hashmap, rather than the keys. The shared index or value may be rotated to random values in a periodic fashion to improve security. The rotation of such data may be shared among the distributed computing node group.

A distributed computing node group may operate in a noisy and/or congested environment resulting in the loss of communication data. Secure messages in such environments may be susceptible to data loss. Thus, it may be desirable to detect data loss of secure messages and to support secure messaging resynchronization and/or re-transmission. A distributed computing node group supporting secure messaging may support such environments by detecting data encrypted with prior group keys and sending a rotation index or value previously shared with the group. Moreover, a member or node which may fail to receive such rotation data may request a resynchronization of such rotation data to resume securing messaging.

Referring now to FIG. 2, a block diagram of selected elements of a distributed computing node group 202 is shown in accordance with some embodiments of the present disclosure. An information handling system or plurality of information handling systems 200 may be grouped together to form a distributed computing node group 202. Group 202 may include a plurality of members 208 connected together with a messaging channel 210. Although group 202 is shown with seven members, group 202 may include any number of members suitable to form a distributed computing node group.

Each member 208 may include a management controller 180 to manage group communications. Members 208 and/or management controllers 180 may use a messaging channel 210 to send and receive messages to each other. The messages may be unencrypted, encrypted, signed, or unsigned. Messaging channel 210 may include any suitable interface between management controllers, including but not limited to a network interface, such as Ethernet, and an I/O interface, such as PCI-E. Group 202 may use secure messaging to improve the security of communications between members 208.

Group 202 may also include a master, such as a primary master 204 and/or a secondary master 206. The master may control and/or manage group 202. Control of group 202 may include the addition and/or removal of members from group 202. Management of group 202 may include rotating indexes or values for secure messaging between members of group 202. Although addition, removal, and rotation are described, the master may perform any operation sufficient to control or manage distributed computing node group 202. In one embodiment, the primary master may be selected at random. In another embodiment, the primary master may be selected using the timestamp of entry into the group, in which the most recent member to join the group or the least recent member to join the group is elected the primary master. The secondary master 206 may serve as the master when the primary master is offline or unavailable. The election or selection of the secondary master 206 may be performed in a similar manner as the primary master.

Referring now to FIG. 3, a flow chart depicting selected elements of a method for secure messaging is shown in accordance with some embodiments the present disclosure. Method 300 may be implemented by any of the elements shown in FIGS. 1 and 2. Method 300 may be initiated by any suitable criteria and may initiate operation at any suitable point. In one embodiment, method 300 may initiate operation at 302. Method 300 may include greater or fewer steps than those illustrated. Moreover, method 300 may execute its steps in an order that is different than those illustrated below. Method 300 may terminate at any suitable step. Moreover, method 300 may repeat operation at any suitable step. Portions of method 300 may be performed in parallel and repeat with respect to other portions of method 300.

At 302, a member may want to join a group. The member may be a management controller associated with an information handling system. At 304, the member distributes a message encrypted in a default key to discover the master of the group. The message distributed by the member with the desire to join the group may be identified with a message type identifier. For example, the identifier may be defined specifically for members to discover the master of the group. The message may be distributed using a group shout, which may leverage an IPv4 broadcast or an IPv6 multicast transmission.

In one embodiment, the default key may be generated using a fixed entry in a hashmap or table. For example, the first entry in the hashmap or index in the table may correspond to the default key. In another embodiment, the default key may be generated from a group passcode shared by an administrator, which may be tagged with a value from a fixed entry in the hashmap or index in the table. The default key may require that the group maintain the same or similar version of the hashmap or table. The version of such a structure may correspond to or be static in reference to the version of firmware loaded on the management controller. The hashmap or table may be of any suitable size to support secure communication between the group, such as 256 rows or entries. The key may be used in any suitable type of encryption to enable secure communication, including but not limited to the Advanced Encryption Standard (AES).

At 306, the master of the group may receive the discovery message and respond with a message encrypted in the default key and containing information to determine the group key. The response message may be a whisper, which may leverage a singlecast or unicast transmission for the intended recipient receives the message. The member may receive the welcome message and decrypt the message using the default key to obtain the information to determine the group key. In one embodiment, the information may be an index into a hashmap or table. In another embodiment, the information may be the group key sent within the message. The message may be identified with a type, such as a welcome message, to welcome the member wishing to join the group. At 308, the member, now part of the group, may transmit a message encrypted with the group key.

At 310, the master of the group, which may have rotated to another member of the group, may receive the encrypted message. The master of the group may rotate as members of the group go offline. A master may go offline for any suitable reason, including but not limited to deliberate offline operations, such as a reboot or power down for maintenance, replacement, and/or decommissioning, and unexpected operations, such as a component failure and/or network traffic or network stability. Members of the group may detect a new master when the master is offline, which may include receiving a new group key or information to determine a new group key. The master may attempt to decrypt the message using the current group key. At 312, it may be determined whether the decrypted message is valid by evaluating the information within the decrypted data. In one embodiment, the information may need to be readable text to be valid. In another embodiment, the information may need to include a header that is properly formed according to a pre-determined format. If the decrypted message is valid, method 300 may proceed to method step 320. Otherwise, method 300 may proceed to method step 314.

At 314, the master of the group may decrypt the encrypted message using a prior group key. The master may attempt to decrypt with the prior group key because the data decrypted using the current group key may not be valid. Using the prior group key may be proper because a member may not have received a key rotation message, which may have been previously sent by the master. The master may determine which prior group key to use based on the message type and timestamp of the message. The message type may verify that the message is intended to be decoded with a group key, rather than a default key. In one embodiment, if the message type corresponds to default-key encryption, method 300 may proceed to method step 318. The timestamp of the message may be a Lamport time stamp or a Unix time-stamp corresponding to the time at which the message was sent, transmitted, and/or received. The master may maintain a list of current and previous group keys in order to support the decryption of messages, which may enable the group to operate in environments in which members have intermittent connections to the master. An intermittent connection may be the result of any suitable cause, including but not limited to noise, software defects, the failure of hardware, and network saturation and/or congestion. For example, faulty cabling may result in the failure of hardware to deliver data reliably. As another example, network congestion on a link or device may increase the loss of data. At 316, it may be determined whether the messaged decrypted with a prior group key is valid. If the decrypted message is valid, method 300 may proceed to method step 320. Otherwise, method 300 may proceed to method step 318. At 318, the master of the group may decrypt the encrypted message using a default key. If the decrypted message is not valid, the master may discard the message.

At 320, the master may determine whether the group key is in need of rotation due to the expiration of a rotation window. In one embodiment, the rotation window may be set for a defined period of time, such as a number of days, hours, or minutes. In another embodiment, the rotation window may be random, in which the next rotation window begins when the current group key is used in the group. The determination may include comparing a current timestamp to an expiration timestamp. The current timestamp may be the actual current time, or may be the time of a recent transaction. The timestamps may be Lamport time stamps, which may indicate the number of messages to be processed during the rotation window or interval between rotating the group key. Expiration may include actual expiration of the group key rotation window or a group key rotation window that may soon expire within a period less than the duration of the window. At 322, the master may rotate the group key based on the expiration of the group key rotation window. For example, if the group key rotation window, which may last for 30 days, expires in 24 hours, the master may rotate the group key based on the determination that the group key rotation window will expire within one day. The rotation may consist of generating a random number to yield a new entry or index, or an increment or decrement in the entry or index. Members of the group may use the new entry or index to generate the new group key. At 324, the master may distribute the rotated group key, or information to determine the group key, to the members of the group. The message distributed may be encrypted using the expired or prior group key, or the default key. The distribution may use an IPv4 broadcast or an IPv6 multicast, and may be identified with a shout communication type. The information may be the entry or index of the group key in the hashmap or table. The group key may be generated using the information located at such a location.

At 326, the master may transmit, or initiate the transmission of another message. The other message may be any type of message sent from the master and encrypted with the current key. The message may be a group shout to all members of the group or may be a whisper to one member of the group. At 328, a member of the group may receive the other message transmitted from the master. In one embodiment, the member may have been offline during the distribution of the rotated group key. In another embodiment, the member may not have received the key rotation message distributing information corresponding to the rotated key. In this case, the master may resynchronize the entry or index corresponding to the rotated key by resending the key rotation message to the member. The master may detect the mismatch or need to resynchronize upon receipt of a message sent by the member by verifying that the node is a valid member of the group and validating that the data in the message cannot be decrypted by the current group key or the default key.

At 330, the member may decrypt the message sent by the master with a locally known group key, which may be the expired or prior group key. At 332, the decrypted message may be evaluated to determine whether it is valid. If not valid, method 300 may proceed to method step 334. Otherwise, method 300 may proceed to method step 338. At method step 334, the member may decrypt the message transmitted from the master using the default key. At 336, it may be determined whether the message from the master decrypted with the default key is valid. If not valid, method 300 may proceed to method step 340. Otherwise, method 300 may proceed to method step 338. At 338, the member may process the valid message. At 340, the member may request a key resynchronization from the master by sending a message to the master encrypted with the default key. The request may be a group shout or a whisper to the master. The master may respond by resending a message encrypted with the default key and the message may include information to determine the current group key. The message may be a welcome message.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for secure messaging, comprising:
receiving an encrypted message from a node, the message encrypted with a default key to discover a master of a group, the master to manage secure communication between members of the group;
decrypting the message using the default key;
sending a welcome message from the master to the node in response to decryption of the message, wherein the welcome message:
is encrypted with the default key to welcome the node into the group as one of the members of the group;
identifies the master of the group to the node; and
includes information to determine a group key;
rotating the group key based on an expiration of a group key rotation window, wherein the group key becomes a prior group key and the rotated group key is a current group key; and
distributing a key rotation message from the master, wherein the key rotation message is encrypted with the prior group key and includes an index to determine the current group key.

2. The method of claim 1, further comprising:
receiving a second encrypted message from the member of the group, wherein the second encrypted message is received at the master after the welcome message is sent to the member and the key rotation message is distributed; and
decrypting the second encrypted message using the prior group key based on a determination that the decryption of the second encrypted message using the current group key is not valid.

3. The method of claim 1, wherein the default key and the group key are AES symmetric keys.

4. The method of claim 1, further comprising:
receiving a request to redistribute the current group key, the request encrypted with one of the default key or the prior group key; and
resending, in response to the request, a message encrypted with the default key, wherein the resent message includes information to determine the current group key.

5. The method of claim 1, wherein the default key and the group key are generated from a static hashmap and a group passcode.

6. The method of claim 1, wherein the expiration of the group key rotation window further comprises comparing a current timestamp to an expiration timestamp.

7. An information handling system, comprising:
a processor subsystem having access to a first memory;
a management controller comprising a secondary processor having access to a second memory, the second memory including an embedded storage partition and the second memory storing instructions executable by the secondary processor to:
receive an encrypted message from a node, the message encrypted with a default key to discover a master of a group, the master to manage secure communication between members of the group;
decrypt the message using the default key;
send a welcome message from the master to the node in response to decryption of the message, wherein the welcome message:
is encrypted with the default key to welcome the node into the group as one of the members of the group;
identifies the master of the group to the node; and
includes information to determine a group key;
rotate the group key based on an expiration of a group key rotation window, wherein the group key becomes a prior group key and the rotated group key is a current group key; and
distribute a key rotation message from the master, wherein the key rotation message is encrypted with the prior group key and includes an index to determine the current group key.

8. The information handling system of claim 7, further comprising instructions executable by the secondary processor to:
receive a second encrypted message from the member of the group, wherein the second encrypted message is received at the master after the welcome message is sent to the member and the key rotation message is distributed; and
decrypt the second encrypted message using the prior group key based on a determination that the decryption of the second encrypted message using the current group key is not valid.

9. The information handling system of claim 7, wherein the default key and the group key are AES symmetric keys.

10. The information handling system of claim 7, further comprising instructions executable by the secondary processor to:
receive a request to redistribute the current group key, the request encrypted with one of the default key or the prior group key; and
resend, in response to the request, a message encrypted with the default key, wherein the resent message includes information to determine the current group key.

11. The information handling system of claim 7, wherein the default key and the group key are generated from a static hashmap and a group passcode.

12. The information handling system of claim 7, wherein expiration of the group key rotation window further comprises a comparison of a current timestamp to an expiration timestamp.

13. The information handling system of claim 8, further comprising instructions executable by the secondary processor to select the prior group key based on a comparison between a timestamp of the second encrypted message with an expiration timestamp of the prior group key.

14. A management controller for an information handling system having a primary processor and a primary memory, the management controller comprising:
a secondary processor having access to a second memory, the second memory including an embedded storage partition and the second memory storing instructions executable by the secondary processor to:
receive an encrypted message from a node, the message encrypted with a default key to discover a master of a group, the master to manage secure communication between members of the group;
decrypt the message using the default key;
send a welcome message from the master to the node in response to decryption of the message, wherein the welcome message:
is encrypted with the default key to welcome the node into the group as one of the members of the group;
identifies the master of the group to the node; and
includes information to determine a group key;
rotate the group key based on an expiration of a group key rotation window, wherein the group key becomes a prior group key and the rotated group key is a current group key; and
distribute a key rotation message from the master, wherein the key rotation message is encrypted with the prior group key and includes an index to determine the current group key.

15. The management controller of claim 14, further comprising instructions executable by the secondary processor to:
receive a second encrypted message from the member of the group, wherein the second encrypted message is received at the master after the welcome message is sent to the member and the key rotation message is distributed; and
decrypt the second encrypted message using the prior group key based on a determination that the decryption of the second encrypted message using the current group key is not valid.

16. The management controller of claim 14, wherein the default key and the group key are AES symmetric keys.

17. The management controller of claim 14, further comprising instructions executable by the secondary processor to:
receive a request to redistribute the current group key, the request encrypted with one of the default key or the prior group key; and
resend, in response to the request, a message encrypted with the default key, wherein the resent message includes information to determine the current group key.

18. The management controller of claim 14, wherein the default key and the group key are generated from a static hashmap and a group passcode.

19. The management controller of claim 14, wherein expiration of the group key rotation window further comprises a comparison of a current timestamp to an expiration timestamp.

20. The management controller of claim 15, further comprising instructions executable by the secondary processor to select the prior group key based on a comparison between a timestamp of the second encrypted message with an expiration timestamp of the prior group key.

* * * * *